US011410197B2

(12) United States Patent
Takahashi et al.

(10) Patent No.: US 11,410,197 B2
(45) Date of Patent: Aug. 9, 2022

(54) MOBILE UNIT, INFORMATION PROCESSING METHOD, AND PROGRAM

(71) Applicant: TOYOTA JIDOSHA KABUSHIKI KAISHA, Toyota (JP)

(72) Inventors: Kentaro Takahashi, Toyota (JP); Hirotaka Sunada, Nagoya (JP); Hideo Hasegawa, Nagoya (JP); Naomi Kondo, Toyota (JP); Takashi Shiomi, Nisshin (JP); Kazuya Mikashima, Nagoya (JP); Jun Usami, Toyota (JP); Yasuhiko Fukuzumi, Toyota (JP); Sayaka Ishikawa, Miyoshi (JP); Katsuhito Yamauchi, Seto (JP); Tasuku Kuno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/102,995

(22) Filed: Nov. 24, 2020

(65) Prior Publication Data
US 2021/0166273 A1   Jun. 3, 2021

(30) Foreign Application Priority Data
Dec. 3, 2019   (JP) .............................. JP2019-219024

(51) Int. Cl.
*G06Q 30/02*   (2012.01)
*G09F 21/04*   (2006.01)
(Continued)

(52) U.S. Cl.
CPC ......... *G06Q 30/0265* (2013.01); *G06Q 10/02* (2013.01); *G06Q 10/067* (2013.01);
(Continued)

(58) Field of Classification Search
USPC ....................................... 705/14.16
See application file for complete search history.

(56) References Cited

U.S. PATENT DOCUMENTS 8,630,897 B1 * 1/2014 Prada Gomez ........ G01C 21/34
705/14.57
10,535,271 B1 * 1/2020 Dyer .................... G05D 1/0088
(Continued)

FOREIGN PATENT DOCUMENTS

JP   2005-056134 A   3/2005

OTHER PUBLICATIONS

Method and System for Positioning Autonomous Vehicles on road based on Advertisements Displayed on Electronic Billboard (Year: 2018).*

(Continued)

*Primary Examiner* — Gautam Ubale
(74) *Attorney, Agent, or Firm* — Oliff PLC (57) ABSTRACT

An autonomous driving vehicle that is a mobile unit according to this disclosure is a mobile unit configured to transport a user to a facility that provides services or commercial products and, at the same time, configured to perform an advertising activity for the services or the commercial products of the facility. The mobile unit includes a control unit configured to acquire data for providing a promotion in the mobile unit and is configured to provide a promotion in the mobile unit based on the acquired data. The promotion is related to the services and the commercial products at the facility.

5 Claims, 6 Drawing Sheets

(51) Int. Cl.
    *G06Q 10/02*    (2012.01)
    *G06Q 10/06*    (2012.01)
    *G06Q 50/30*    (2012.01)

(52) U.S. Cl.
    CPC ........... *G06Q 50/30* (2013.01); *G09F 21/049*
    (2020.05); *G06Q 30/0264* (2013.01)

(56) References Cited

U.S. PATENT DOCUMENTS

| | | | |
|---|---|---|---|
| 10,843,566 B2 * | 11/2020 | Moon | G05D 1/0088 |
| 2009/0313077 A1 * | 12/2009 | Wheeler, IV | G06Q 30/0601 |
| | | | 705/7.14 |
| 2012/0041675 A1 * | 2/2012 | Juliver | G06Q 10/08 |
| | | | 701/465 |
| 2015/0185034 A1 * | 7/2015 | Abhyanker | G06Q 50/01 |
| | | | 701/23 |
| 2015/0262239 A1 * | 9/2015 | Goralnick | G01C 21/3697 |
| | | | 701/23 |
| 2018/0188731 A1 * | 7/2018 | Matthiesen | G01C 21/3664 |
| 2019/0051171 A1 * | 2/2019 | Malkes | G08G 1/08 |
| 2019/0243383 A1 * | 8/2019 | Cantrell | G05D 1/0291 |
| 2020/0223454 A1 * | 7/2020 | Fox | G06Q 50/01 |
| 2021/0331698 A1 * | 10/2021 | McFarland, Jr. | G06Q 50/30 |

OTHER PUBLICATIONS

Fast Handover Management in IP-based Vehicular Networks (Year: 2013).*

Analyzing Location-Based Advertising for Vehicle Service Providers Using Effective Resistances (Year: 2019).*

\* cited by examiner

FIG. 6

MOBILE UNIT, INFORMATION PROCESSING METHOD, AND PROGRAM

INCORPORATION BY REFERENCE

The disclosure of Japanese Patent Application No. 2019-219024 filed on Dec. 3, 2019 including the specification, drawings and abstract is incorporated herein by reference in its entirety.

BACKGROUND

1. Technical Field

The present disclosure relates to a mobile unit, an information processing method, and a program.

2. Description of Related Art

Conventionally, various systems for the cyclic transportation service are proposed (for example, see Japanese Unexamined Patent Application Publication No. 2005-56134 (JP 2005-56134 A)). Meanwhile, in businesses for users where various services or commercial products are provided to users, an activity to advertise the provided services or commercial products is performed to attract customers. For use in this activity, a special vehicle designed for advertisement is in operation.

SUMMARY

The present disclosure further enhances the convenience of users who receive the provision of services or commercial products when such services or commercial products are provided.

One aspect of the present disclosure relates to a mobile unit configured to transport a user to a facility that provides services or commercial products and, at the same time, configured to perform an advertising activity for the services or the commercial products of the facility. The mobile unit includes a control unit. The control unit is configured to acquire data for providing a promotion in the mobile unit and is configured to provide a promotion in the mobile unit based on the acquired data. The promotion is related to the services and the commercial products at the facility. Another aspect of the present disclosure relates to an information processing method performed by at least one computer of the mobile unit. A still another aspect of the present disclosure relates to a program that causes at least one computer to perform the processing of the control unit.

The mobile unit according to the present disclosure further enhances the convenience of users who receive the provision of services or commercial products when services or commercial products are provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An information processing device of a mobile unit according to an embodiment of the present disclosure, an information processing method used by the information processing device, and a program will be described below with reference to the drawings.

Figure 1:
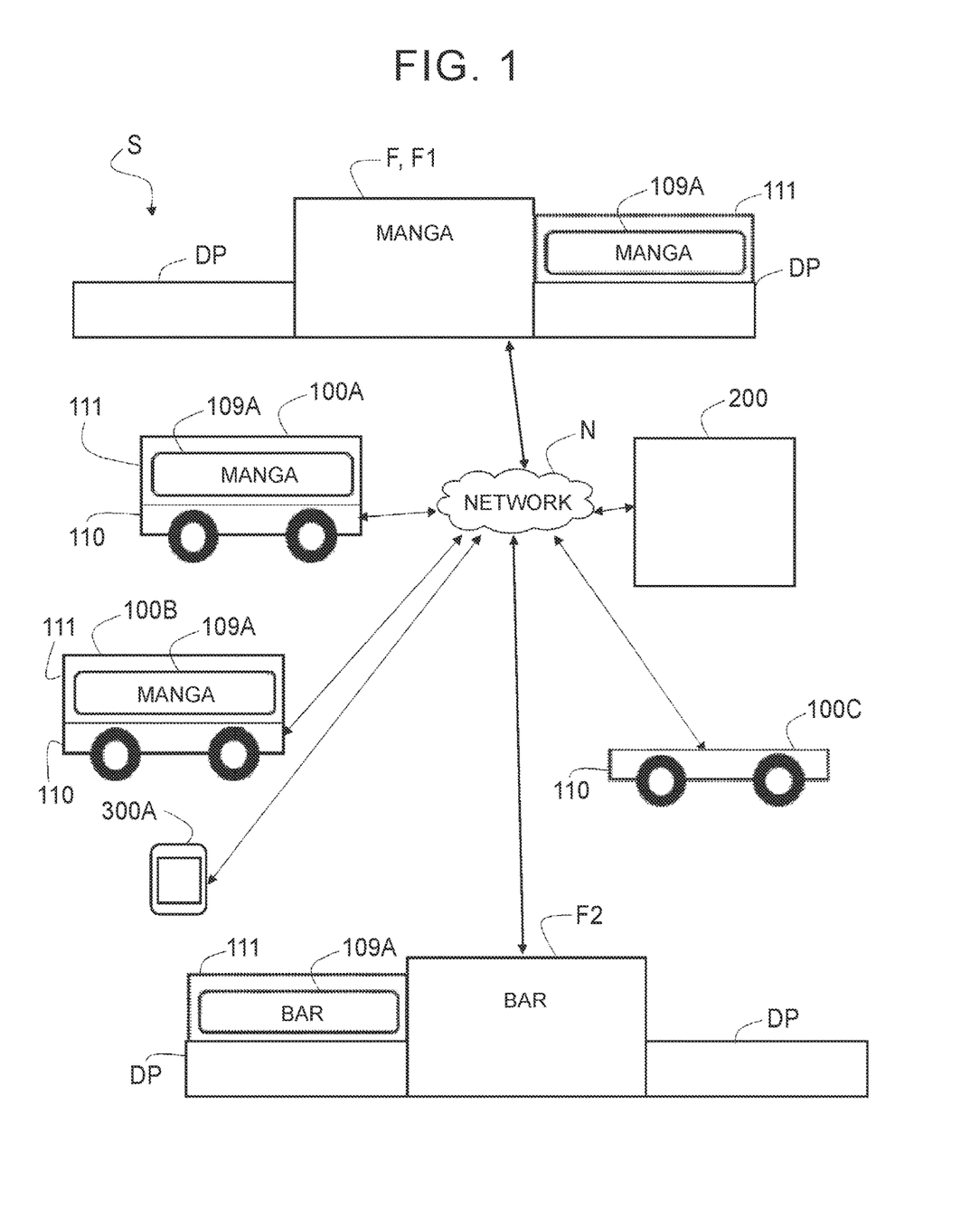
FIG. 1 is a conceptual diagram of a transportation system according to one embodiment of the present disclosure.

FIG. 1 conceptually shows a system S for transportation according to one embodiment of the present disclosure. The system S includes autonomous driving vehicles 100 (100A, . . . ) and a server device 200. The system S further includes user devices 300 (300A, . . . ).

The autonomous driving vehicle 100 is an example of a mobile unit configured to provide not only the transportation service of the system S and but the advertisement activity of services or commercial products provided by a facility F (F1, F2, . . . ) located at the destination of transportation. The server device 200, which is an information processing device, is a computer on a network N. The server device 200, configured to be able to communicate with each of an information processing device 102 of the autonomous driving vehicles 100 via the network N, cooperates with the information processing device 102 of the autonomous driving vehicles 100 via the network N. FIG. 1 shows only three autonomous driving vehicles (100A, 100B, and 100C) of the plurality of the autonomous driving vehicles 100 (100A, . . . ). However, the number of autonomous driving vehicles 100 is not limited and any number of autonomous driving vehicles 100 may be included. The server device 200 communicates with each of the vehicles 100 and sends data to the vehicle 100 for use by the processing therein. Therefore, the server device 200 is thought of as an example of at least one computer that controls the mobile units.

The server device 200 can communicate with other server devices via the network N. The server device 200 is configured to be able to communicate with each of the autonomous driving vehicles 100 and also configured to be able to communicate with each of the user devices 300 via the network N.

The user device 300 is configured to be able to communicate with the server device 200 via the network N. The user device 300 is also configured to be able to communicate with the autonomous driving vehicle 100 via the network N. In particular, the user device 300 is configured to be able to communicate directly with the autonomous driving vehicle 100 associated with the user device 300, for example, when the user device 300 is used in the autonomous driving vehicle 100. The user device 300, though associated with one user in this embodiment, may be associated with a plurality of users. FIG. 1 shows only the user device 300A that is one of the plurality of user devices 300 (300A, . . . ). However, the number of user devices 300 is not limited and any number of user devices 300 may be included.

The autonomous driving vehicle 100 is also called an electric vehicle (EV) palette. The autonomous driving vehicle 100, which is a mobile unit capable of autonomous driving and unmanned driving, comes in various sizes. For example, the autonomous driving vehicles 100 of various sizes are available, from a small one that allows only one passenger to ride to a large one that allows tens of passengers to ride.

The autonomous driving vehicle 100 has the control function for controlling itself and the communication function. The autonomous driving vehicle 100 can perform the processing that can be performed by the autonomous driving vehicle 100 alone. In addition, the autonomous driving vehicle 100 can cooperate with the server device on the network N to provide the user with functions and services that are added by the server device on the network N. The autonomous driving vehicle 100 need not be an unmanned vehicle. For example, a sales person, a customer service person, or a security person may ride on the autonomous driving vehicle 100. For example, when the service provided by the autonomous driving vehicle 100 is a food and drink service, a chef, a waiter, or the like may ride on the autonomous driving vehicle 100. Similarly, when the service provided by the autonomous driving vehicle 100 is a child-care service, a nursery teacher or the like may ride on the autonomous driving vehicle 100. Note that the autonomous driving vehicle 100 need not be a completely autonomous vehicle. For example, depending on the situation, the autonomous driving vehicle 100 may be a vehicle in which a person drives or assists in driving. Although the autonomous driving vehicle 100 is used as a mobile unit in this embodiment, the mobile unit in the system S may be a vehicle incapable of autonomous driving, that is, the mobile unit may be a vehicle in which driving operation by a driver is indispensable.

Figure 2:
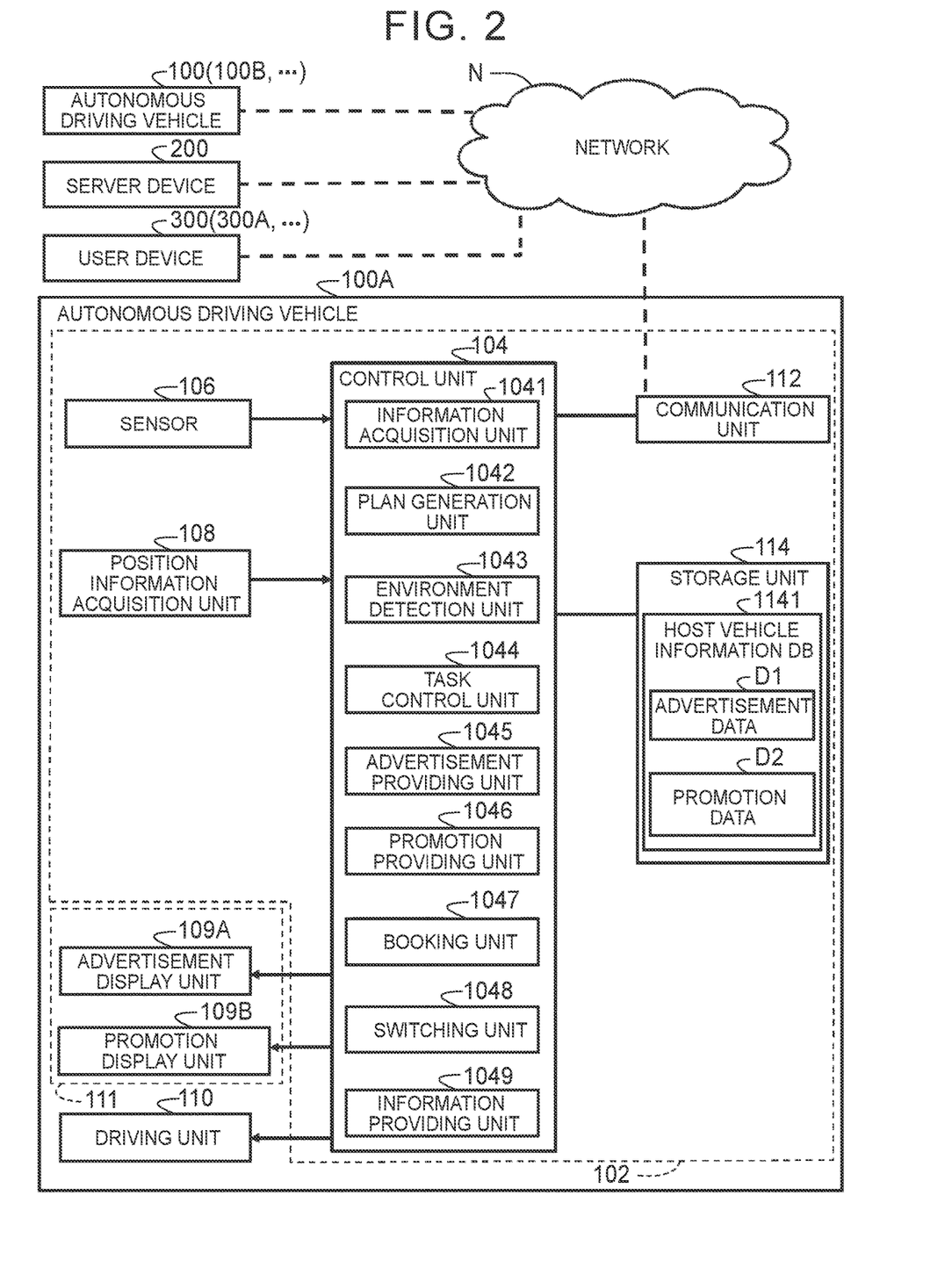
FIG. 2 is a block diagram schematically showing a configuration of the system shown in FIG. 1 with focus on a configuration of an autonomous driving vehicle.

Each of the autonomous driving vehicles 100 includes a driving unit 110 and a riding unit 111. In this embodiment, the riding unit 111 is provided on the driving unit 110 in such a way that they can be separated. This means that the autonomous driving vehicle 100 is a top-bottom separation type vehicle. The driving unit 110 includes the power source and the wheels and, in this embodiment, further includes the information processing device 102. The riding unit 111 provides a space for users where a promotion related to the services or commercial products related to a facility F (F1, F2, . . . ) is provided. Therefore, the riding unit 111, which can be separated from the driving unit 110, corresponds to a providing unit that can provide a promotion. In FIG. 2 that will be described later, the information processing device 102 is shown as a component separate from the driving unit 110 and the riding unit 111. This means that the information processing device 102 may be mounted on either the driving unit 110 or the riding unit 111. In this embodiment, the information processing device 102 is mounted on the driving unit 110. In the description below, note that the autonomous driving vehicle 100 refers to the autonomous driving vehicle 100 that includes the driving unit 110 and the information processing device 102 but does not refer to the autonomous driving vehicle 100 that includes only the riding unit 111.

As described above, the autonomous driving vehicle 100 is also configured to be able to communicate with the user devices 300 (300A, . . . ) via the network N. The user device 300 can receive an operation (input or similar operation) from a user for communicating not only with the server device 200 but also with the autonomous driving vehicle 100 via the network N.

The server device 200 is a device that sends a driving command to the autonomous driving vehicle 100. For example, the server device 200 sends a driving command to the autonomous driving vehicle 100. This driving command includes a driving plan about when and where to pick up potential users such as a passenger who wants to receive services at the facility F. In addition, the server device 200 provides the autonomous driving vehicle 100 with various types of data for an advertising activity (for example, advertisements) regarding commercial products or services at the facility F or various types of data for providing a promotion.

Each of the components of the system S shown in FIG. 1 will be described in detail below. FIG. 2 is a block diagram schematically showing a configuration of the system S including the autonomous driving vehicle 100, server device 200, and user device 300, with focus on a configuration of the autonomous driving vehicle 100A. FIG. 2 shows a configuration of the autonomous driving vehicle 100A that is an example of the autonomous driving vehicle 100. The other autonomous driving vehicles 100B, 100C and the like have the same configuration as the autonomous driving vehicle 100A.

The autonomous driving vehicle 100A shown in FIG. 2 includes an information processing device 102 that, in turn, includes a control unit 104 that substantially performs the function of the information processing device 102. The autonomous driving vehicle 100A can travel according to a driving command acquired from the server device 200. More specifically, the autonomous driving vehicle 100A properly travels while sensing the surroundings of the vehicle based on a driving command acquired via the network N. During this traveling, the autonomous driving vehicle 100A can provide services and the like to various users. The information processing device 102 is thought of as an example of at least one computer that controls the mobile unit.

The autonomous driving vehicle 100A, which includes the driving unit 110 and the riding unit 111 described above, further includes a sensor 106, a position information acquisition unit 108, an advertisement display unit 109A, a promotion display unit 109B, a communication unit 112, and a storage unit. 114. The autonomous driving vehicle 100A operates on electric power supplied from the battery.

The sensor 106 is a unit for sensing the surroundings of the vehicle. The sensor 106 typically includes a stereo camera, laser scanner, Light Detection and Ranging or Laser Imaging Detection and Ranging (LIDAR), radar, and the like. The information acquired by the sensor 106 is sent to the control unit 104. The sensor 106 includes a sensor for the host vehicle to travel autonomously. The sensor 106 includes cameras provided on the body of the autonomous driving vehicle 100A. For example, the camera may be a capturing device using an image sensor such as a charge-coupled device (CCD), metal-oxide-semiconductor (MOS), or complementary metal-oxide-semiconductor (CMOS).

The position information acquisition unit 108 is a unit for acquiring the current position of the vehicle; typically, the position information acquisition unit 108 includes a Global Positioning System (GPS) receiver and the like. The information acquired by the position information acquisition unit 108 is sent to the control unit 104. The GPS receiver, which functions as a satellite signal receiver, receives signals from a plurality of GPS satellites. Each of the GPS satellites is an artificial satellite that orbits the earth. The satellite positioning system, i.e., Navigation Satellite System (NSS), is not limited to the GPS. The position information may be detected based on signals from various satellite positioning systems. The NSS is not limited to the Global Navigation Satellite System, and may include the Quasi-Zenith Satellite System. For example, the NSS includes "Galileo" launched by the European Union and "Michibiki" launched by Japan that is integrated with the GPS.

The control unit 104 is a computer that controls the autonomous driving vehicle 100A based on the information acquired from the sensor 106, position information acquisition unit 108, and the like. The control unit 104 is an example of a control unit that receives a driving command from the server device 200 for controlling the traveling of the autonomous driving vehicle 100A, which is a mobile unit, and for controlling the pick-up and drop-off of various users.

The control unit 104, with a CPU and a main storage unit, executes a program for performing the information processing. The CPU is also called a processor. The main storage unit of the control unit 104 is an example of a main storage device. The CPU of the control unit 104 executes a computer program, which is loaded into the main storage unit in an executable form, to provide various functions. The main storage unit of the control unit 104 stores computer programs executed by the CPU and data. The main storage unit of the control unit 104 is a dynamic random access memory (DRAM), a static random access memory (SRAM), a read only memory (ROM), or the like.

The control unit 104 is connected to the storage unit. 114. The storage unit 114, a so-called external storage unit, is used as a storage area that supplements the main storage unit of the control unit 104. The storage unit stores computer programs executed by the CPU of the control unit 104 and data. The storage unit. 114 is a hard disk drive, a solid state drive (SSD), or the like.

The control unit 104 includes the following functional modules: an information acquisition unit 1041, a plan generation unit 1042, an environment detection unit 1043, a task control unit 1044, an advertisement providing unit 1045, a promotion providing unit 1046, a booking unit 1047, a switching unit 1048, and an information providing unit 1049. Each of the functional modules is implemented when the control unit 104 (more specifically, the CPU included in the control unit 104) executes the corresponding program stored in the main storage unit or the storage unit. 114.

The information acquisition unit 1041 acquires the information on a driving command from the server device 200. The driving command may include the information on the pick-up position (pick-up place), drop-off position (drop-off place), pick-up time, and drip-off time of a user or a potential passenger who wants to use the transportation service provided by the autonomous driving vehicle 100A. Furthermore, the driving command may include the user information on the user (for example, the user ID or the terminal information on the user device 300 associated with the user). The information acquisition unit 1041 regularly or irregularly acquires the information on the host vehicle (for example, the user riding status) and stores the acquired information in a host vehicle information database 1141 of the storage unit 114. The information acquisition unit 1041 acquires the information also from the user device 300. For example, when the information on a booking instruction on a facility (that is, booking information) is acquired from the user device 300, the information acquisition unit 1041 sends the acquired booking information to the booking unit 1047.

In addition, the information acquisition unit 1041 acquires advertisement data D1, used for an advertising activity, from the server device 200. This advertisement data D1 is sent to the advertisement providing unit 1045, is stored in the host vehicle information database 1141 of the storage unit. 114, and is used for displaying an advertisement on the advertisement display unit 109A. The information acquisition unit 1041 also acquires promotion data D2 from the server device 200. This promotion data D2 is sent to the promotion providing unit 1046, is stored in the host vehicle information database 1141 of the storage unit. 114, and is used for displaying a promotion on the promotion display unit 109B. The advertisement data D1 and the promotion data D2 relate to a facility F that provides commercial products or services and, in this embodiment, relate to the same facility. The advertisement data D1 and the promotion data D2, though erased respectively in this embodiment when new data is acquired, may be stored until a predetermined condition is satisfied. The predetermined condition is a condition that is satisfied, for example, when the storage capacity of the advertising data D1 and the promotion data D2 reaches a predetermined capacity.

The plan generation unit 1042 generates a driving plan of the host vehicle based on the driving command acquired from the server device 200, particularly, based on the information on the driving plan included in the acquired driving command. The driving plan generated by the plan generation unit 1042 is sent to the task control unit 1044 that will be described later. In this embodiment, the driving plan is composed of data that defines a route on which the autonomous driving vehicle 100A is to travel and the processing that the autonomous driving vehicle 100A is to perform on a part or all of the route. Examples of data included in the driving plan are as follows.

(1) Data Indicating, by a Set of Road Links, a Route on which the Host Vehicle is to Travel A route on which the host vehicle is to travel may be automatically generated based on the given start point and destination, for example, by referring to the map data stored in the storage unit 114 while using the information on the travel plan, included in the driving command, as its base. The route may also be generated using an external service.

(2) Data Indicating the Processing to be Performed by the Host Vehicle at a Point on the Route The processing to be performed by the host vehicle on a route includes, but not limited to, "picking up a user", "dropping off a user", and "providing services".

The environment detection unit 1043 detects the environment around the vehicle based on the data acquired by the sensor 106. The objects detected by the environment detection unit 1043 include, but are not limited to, the number of lanes, the positions of the lanes, the number of vehicles around the host vehicle, the positions of those vehicles, the number of obstacles around the host vehicle (for example, pedestrians, bicycles, structures, buildings, etc.), the positions of those obstacles, the road structure, and the road signs. Any object may be detected as long as it is necessary for autonomous traveling. Furthermore, the environment detection unit 1043 may track a detected object. For example, from the difference between the coordinates of an object detected one step before and the current coordinates of the object, the environment detection unit 1043 may calculate the relative speed of the object. The data on the environment (hereinafter, referred to as environmental data), detected by the environment detection unit 1043, is sent to the task control unit 1044 that will be described later.

The task control unit 1044 controls the driving, that is, the traveling of, the host vehicle that is a mobile unit, based on the driving plan generated by the plan generation unit 1042, the environmental data generated by the environment detection unit 1043, and the position information on the host vehicle acquired by the position information acquisition unit 108. For example, the task control unit 1044 causes the host vehicle to travel along the predetermined route while controlling the host vehicle in such a way that an obstacle does not enter the predetermined safety area of the host vehicle. For autonomously driving the vehicle, a known method may be used. In addition, the task control unit 1044 performs tasks other than traveling, based on the driving plan generated by the plan generation unit 1042. Examples of such tasks include the picking-up and dropping-off a user and the issuance of a receipt or a deposit certificate.

The advertisement providing unit 1045 provides an advertisement as an advertising activity of commercial products or services of the facility F to which the autonomous driving vehicle 100 is related or to which the autonomous driving vehicle 100 travels. In this embodiment, an advertisement is displayed on the advertisement display unit 109A as the advertising activity. The advertisement display unit 109A, though provided on the outer surface of the riding unit 111 as shown in FIG. 1, may also be provided on the driving unit 110. On the advertisement display unit 109A, a still image or a moving image may be displayed. In addition, sounds, such as voices or music, may also be output as an advertising activity. Therefore, though the advertisement display unit 109A is shown as an example of the advertising activity unit in this example, the advertising activity unit may also be a moving image display unit, a voice output unit such as a speaker, or the like. The advertisement providing unit 1045 attracts users to the autonomous driving vehicle 100 by providing an advertisement. Some of the users who are attracted to the autonomous driving vehicle 100 ride on the autonomous driving vehicle 100 and then receive the processing such as the one described below performed by the promotion providing unit 1046.

The promotion providing unit 1046 provides a promotion of commercial products or services provided at the facility F to which the autonomous driving vehicle 100 is related or to which the autonomous driving vehicle 100 travels. The promotion includes provision of a simulated experience of commercial products or services, provision of still images or moving images to increase the willingness to purchase commercial products, and the like. In this embodiment, a promotion is performed by displaying an image on the promotion display unit 109B provided in the vehicle cabin of the riding unit 111. For example, assume that the facility F is a comic facility F1 that allows the user to browse a large number of comic books. In this case, the promotion providing unit 1046 acquires the images of one or more of comic electronic books, stored in the comic facility F1, as the promotion data and displays the acquired images on the promotion display unit 109B. That is, the promotion providing unit 1046 allows a user who wants to browse a comic book (actual book) in the comic facility F1 to have a simulated experience of browsing the comic book via the image of an electronic book. Similarly, when the facility F is a tutoring school, the promotion providing unit 1046 may provide the user with content, which is a preparation or review of learning content at the tutoring school, via the display and the speaker. In addition, when the facility F is a store that sells commercial products, the promotion providing unit 1046 may superimpose the image of a commercial product on the image of the user for providing a simulation image when the user uses the commercial product. For example, when the commercial product is a clothing item, the promotion providing unit 1046 may superimpose the image of the commercial product on the image of the user to aid the user or the user's family in determining whether the clothing item looks good. In other words, in this embodiment, a promotion provides the user with not only a simple advertising activity but also with an actual experience itself or a simulated experience close to an actual experience. A promotion provided in this way improves user's convenience and further increases the willingness to receive a service, or to purchase commercial products, at the facility F.

The booking unit 1047 starts operation when booking instruction information is acquired from the user device 300 via the information acquisition unit 1041 in response to a promotion provided by the promotion providing unit 1046. The booking unit 1047 books the facility F relating to the promotion or books a purchase of a commercial product or a service of the facility F (hereinafter, facility or the like). When booking, the booking unit 1047 sends and receives the booking instruction information to and from the server device 200 and books the facility or the like in consideration of the time estimated for the autonomous driving vehicle 100A to arrive at the facility F. When the facility F cannot be booked due to congestion at the facility F or a time of day, the booking unit 1047 sends a switching instruction to the switching unit. 1048.

The switching unit 1048 switches a facility, related to a promotion provided by the promotion providing unit promotion providing unit 1046, from one facility to another. When a switching instruction is received from the booking unit 1047, the switching unit. 1048 selects and extracts a new facility based on the information such as the user information and the time of day. To allow for this switching, a database storing a list of facilities and a list of services or commercial products provided at the facilities is provided from the facility information database of the server device 200. For example, when the comic facility F1 that is a first facility has no vacant seat, the switching unit. 1048, which receives a switching instruction, selects a second facility based on the age of the user and the time of day. For example, when the user is an adult and it is a nighttime, the switching unit. 1048 can refer to the database to select a bar facility as a second facility. At this time, the switching unit. 1048 may communicate with the server device 200 to confirm that the second facility has a vacant seat. After confirming that the second facility has a vacant seat, the switching unit 1048 acquires the advertisement data and the promotion data, related to the commercial products or services of the second facility, from the server device 200 via the information acquisition unit 1041. This makes it possible to provide an advertising activity based on the advertisement data on the second facility as well as a promotion based on the promotion data on the second facility.

The information providing unit 1049 regularly or irregularly provides the information on the host vehicle, stored in the host vehicle information database 1141, to the server device 200. For example, the information providing unit 1049 sends to the server device 200 the information indicating to which facility an advertising activity based on the advertisement data D1 or a promotion based on the promotion data D2 corresponds. This allows the current status of the autonomous driving vehicle 100A to be reflected on the facility information database of the server device 200.

The advertisement display unit 109A is a monitor for those outside of the autonomous driving vehicle 100A. In this embodiment, the advertisement display unit 109A is provided on the riding unit 111 of the autonomous driving vehicle 100A. For example, on the advertisement display unit 109A of the autonomous driving vehicle 100A shown in FIG. 1, "MANGA" indicating the comic facility F1 is displayed based on the advertisement data D1.

The promotion display unit 109B is a monitor that provides a promotion to the users in the vehicle. In this embodiment, the promotion display unit 109B is provided in the riding unit 111 of the autonomous driving vehicle 100A for use as a monitor for all users in the vehicle. Instead of this, the promotion display unit 109B may also be a monitor provided for each of the users in the vehicle. The promotion display unit 109B may be a device that can communicate with the user device 300 of a user in the vehicle and, in this case, a promotion may be displayed on the user device 300.

The driving unit 110 is a unit that drives the autonomous driving vehicle 100A based on a command generated by the task control unit 1044, as described above. The driving unit 110 is configured, for example, by at least one of a motor for driving the wheels, an inverter, a brake, a steering mechanism, a secondary battery, and the like.

The communication unit 112 has a communication means for connecting the autonomous driving vehicle 100A to the network N. In this embodiment, the autonomous driving vehicle 100A can communicate with other devices, such as the server device 200 and the user device 300, via the network N. The communication unit 112 may further include a communication means for allowing the autonomous driving vehicle 100A, which is the host vehicle, to perform inter-vehicle communication with another autonomous driving vehicle 100 (100B, . . . ).

Next, the server device 200 will be described. The server device 200 is a device that provides various information, such as the information about the commercial products or services provided at the facility F, the booking status, and the facility usage status, to each of the plurality of autonomous driving vehicles 100. The server device 200 is a device that also provides the driving command described above.

Figure 3:
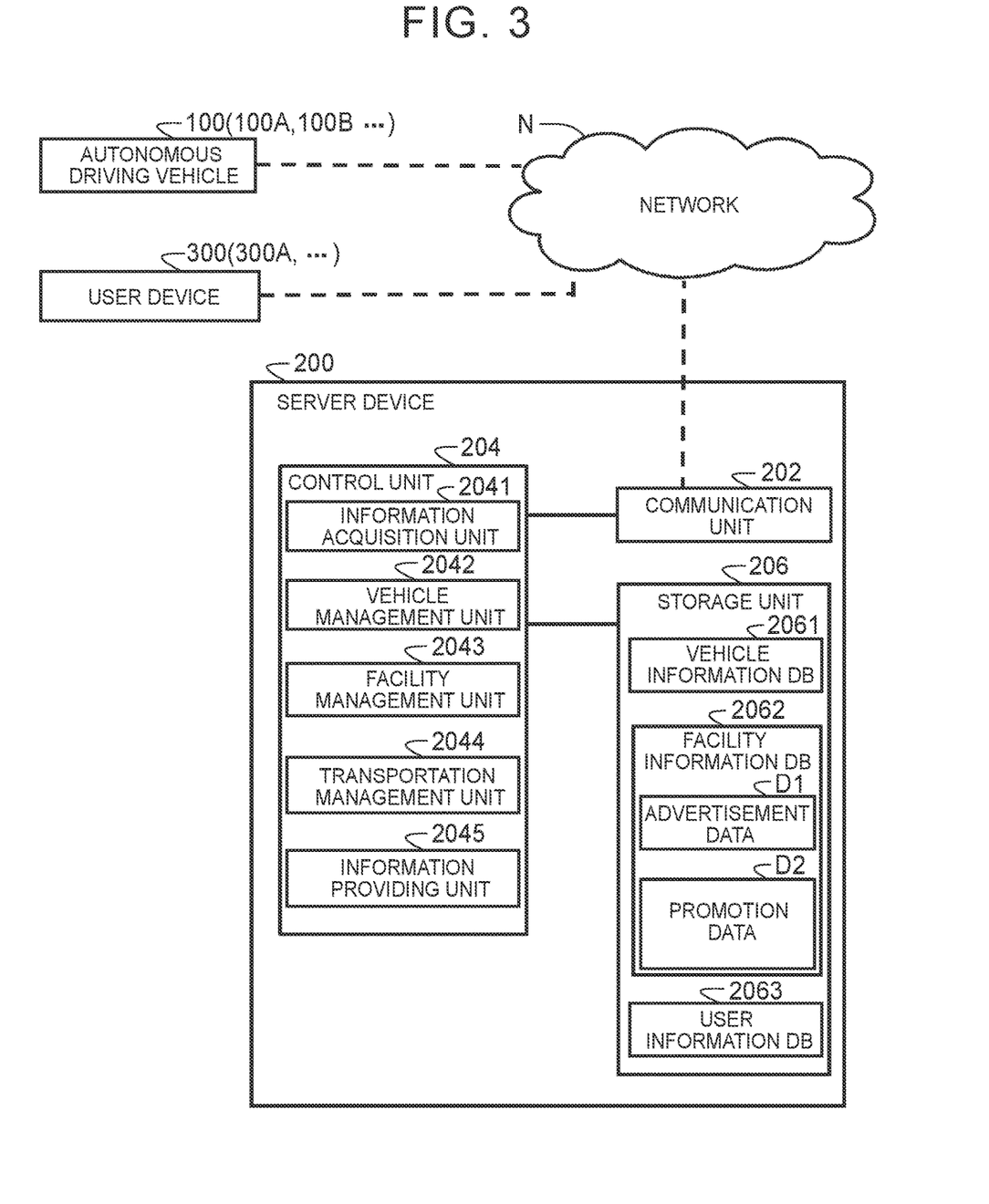
FIG. 3 is a block diagram schematically showing a configuration of the system shown in FIG. 1 with focus on a configuration of a server device.

The server device 200 is an information processing device. As shown in FIG. 3, the server device 200 includes a communication unit 202, a control unit 204, and a storage unit 206. Like the communication unit 112, the communication unit 202 has a communication function for connecting the server device 200 to the network N. The communication unit 202 of the server device 200 is a communication interface for communicating with the autonomous driving vehicle 100 and the user device 300 via the network N. Like the control unit 104, the control unit 204, with a CPU and a main storage unit, executes a program for performing information processing. Of course, the CPU is a processor, and the main storage unit of the control unit 204 is an example of the main storage device. The CPU of the control unit 204 executes a computer program, loaded in an executable form in the main storage unit, to provide various functions. The main storage unit of the control unit 204 stores computer programs executed by the CPU, data, and the like. The main storage unit of the control unit 204 is a DRAM, SRAM, ROM or the like.

The control unit 204 is connected to the storage unit 206. The storage unit 206 is an external storage unit that is used as a storage area for supplementing the main storage unit of the control unit 204. The storage unit 206 stores computer programs executed by the CPU of the control unit 204 and data. The storage unit 206 is a hard disk drive, SSD, or the like.

The control unit 204 is a unit that controls the server device 200. As shown in FIG. 3, the control unit 204 includes the following functional modules: an information acquisition unit 2041, a vehicle management unit 2042, a facility management unit 2043, a transportation management unit 2044, and an information providing unit 2045. Each of these functional modules is implemented when the CPU of the control unit 204 executes the corresponding program stored in the main storage unit or the storage unit 206.

The information acquisition unit 2041 acquires various types of information from the autonomous driving vehicle 100 or the user device 300. The information acquisition unit 2041 regularly acquires the position information, the information stored in the host vehicle information database 1141, and the like from the autonomous driving vehicle 100 and sends the acquired information to the vehicle management unit 2042. Furthermore, the information acquisition unit 2041 acquires the information from various facilities F, for example, the information on the commercial products or services provided by each of those facilities F, and sends the acquired information to the facility management unit 2043. The information acquired in this way includes the advertisement data D1 on the commercial products or services and the promotion data D2 on the commercial products or services. The information further includes the information on the booking status of commercial products or services provided at each of the various facilities F or the information on the facility usage status. The advertisement data and the promotion data, which are acquired from the information processing device of the facility F in this embodiment, may also be acquired from another server device or the like. Furthermore, when the information on a ride request is received from the user device 300, the information acquisition unit 2041 sends the received information to the transportation management unit 2044.

The vehicle management unit 2042 manages the information on a plurality of autonomous driving vehicles 100 under management of the server. More specifically, in each predetermined cycle, the vehicle management unit 2042 receives the information, such as the data on the autonomous driving vehicles 100, from the plurality of the autonomous driving vehicles 100 via the information acquisition unit 2041 and stores the received information in the vehicle information database 2061 of the storage unit 206. As the information on the autonomous driving vehicle 100, the position information and the vehicle information are used. The vehicle information includes, for example, the information on the identifier, usage/type, and the standby point (garage or business office) of the autonomous driving vehicle 100 and the information on the door type, vehicle body size, luggage compartment size, load capacity, mileage when fully charged, current mileage, and current status. However, the vehicle information may be the information other than those given above. The information on the current status includes the information on the user riding status and the service provision status.

The facility management unit 2043 stores not only the information on the booking status and the facility usage status of the facilities F acquired via the information acquisition unit 2041, but also the above-described advertisement data D1 and promotion data D2, in a facility information database 2062 of the storage unit 206. When stored, the information is structured so that various types of information can be searched for on a facility basis.

The transportation management unit 2044 generates a schedule for the user, associated with the user device 300, to ride on the autonomous driving vehicle 100, based on the information acquired by the information acquisition unit 2041 and, according to the generated schedule, generates a driving command to be sent to the autonomous driving vehicle 100. Generation of this schedule includes the creation of the schedule information such as the transportation route and the vehicle arrival time at each stop along the transportation route. To generate this transportation route and the like, the transportation management unit 2044 refers to the map information database stored in the storage unit 206. In addition, the transportation management unit 2044 manages the provision of an advertising activity and a promotion to be performed in the autonomous driving vehicle 100. The transportation management unit 2044 provides the advertisement data D1 and the promotion data D2 used for the advertising activity and the promotion to the autonomous driving vehicle 100 via the information providing unit 2045. When the information on a ride request is not received from the user device 300, the transportation management unit 2044 generates the above-described driving command to be sent to the autonomous driving vehicle 100 so that the autonomous driving vehicle 100 will travel to the facility F in accordance with the predetermined driving schedule. This driving command is provided to the autonomous driving vehicle 100. At this time, the advertisement data D1 on the facility F, which is the transportation destination of the autonomous driving vehicle 100, is provided to the autonomous driving vehicle 100. Providing the advertisement data D1 in this way allows the autonomous driving vehicle 100 to perform the advertising activity for the services or commercial products of the facility F while traveling to the facility F.

The information providing unit 2045 provides the autonomous driving vehicle 100 with the information on the facility F to be stored in the autonomous driving vehicle 100. For example, when the information on the comic facility F1 is requested based on an instruction from the transportation management unit 2044, the information providing unit 2045 provides the advertisement data D1 and promotion data D2 on the comic facility F1 to the autonomous driving vehicle 100. Also, when a user can ride on the autonomous driving vehicle 100, the information providing unit 2045 provides the driving information, such as the information on the pick-up time and the pick-up place, to the user device 300 of the user.

Figure 4:
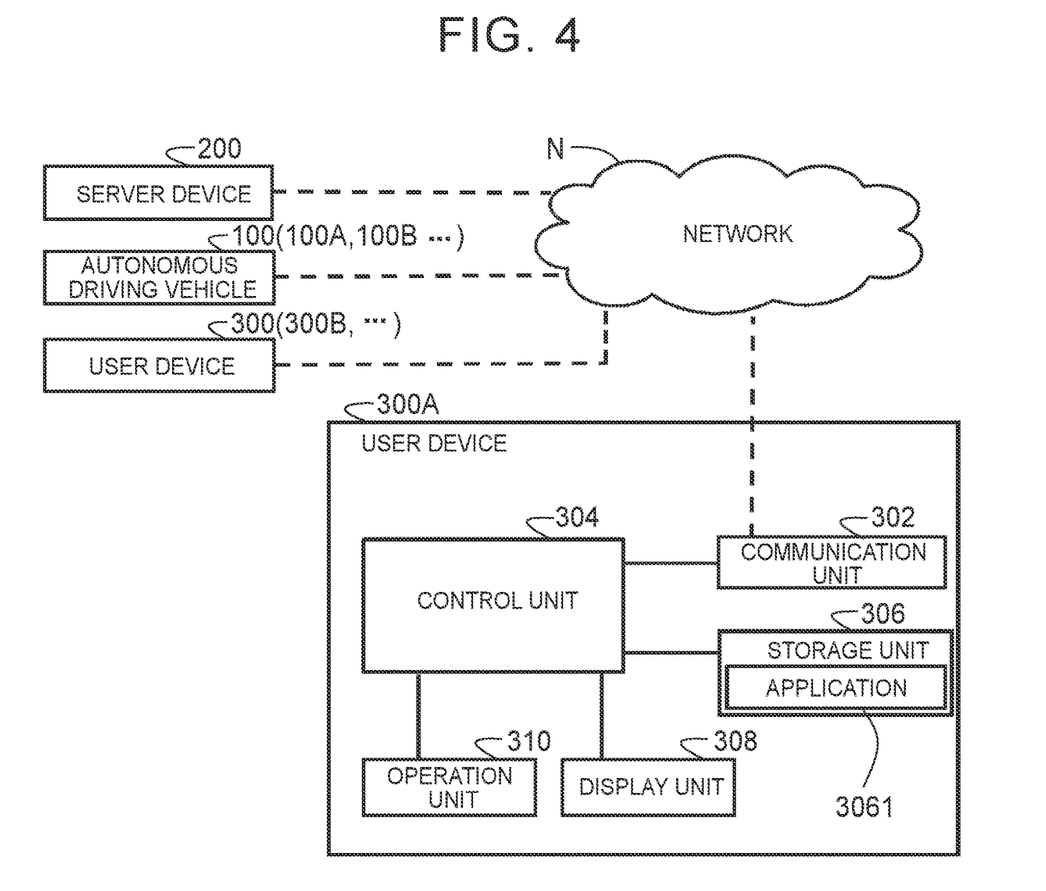
FIG. 4 is a block diagram schematically showing a configuration of the system shown in FIG. 1 with focus on a configuration of a user device.

Next, the user device 300 will be described. The user device 300 is, for example, a mobile terminal, a smartphone, a personal computer, or the like. FIG. 4 shows an example of the user device 300A that includes a communication unit 302, a control unit 304, and a storage unit 306. The communication unit 302 and the storage unit 306 of the user device 300A are the same as the communication unit 202 and the storage unit 206 of the server device 200, respectively. The user device 300A further includes a display unit 308 and an operation unit 310. The display unit 308 is, for example, a liquid crystal display, an electroluminescence panel, or the like. The operation unit 310 may be, for example, a keyboard, a pointing device, or the like. More specifically, the operation unit 310 in this embodiment includes a touch panel and is substantially integrated with the display unit 308.

Like the control unit 204 of the server device 200, the control unit 304 has a CPU and a main storage unit. The CPU of the control unit 304 executes an application program (hereinafter, referred to an application) 3061 stored in the storage unit 306. The application 3061 is an application program for accessing the information delivered from a web browser or the server device 200. The application 3061, with a GUI, receives an input from a user (for example, receives an access) and sends the received input to the autonomous driving vehicle 100 or the server device 200 via the network N. The user device 300 allows the user to select and enter a desired service, such as a transportation service, for communication with the server device 200 and the autonomous driving vehicle 100.

The application 3061, when executed, displays various function buttons, such as a button for the facility information, on the screen of the display unit 308 of the user device 300A. In this embodiment, the application 3061 displays, as the facility information, the information on the commercial products or services provided by a facility in the area where the user device 300A is positioned, based on the position information on the user device 300A. In particular, the application 3061 displays the information on the commercial products or services provided by the autonomous driving vehicle 100 that is scheduled to pass through a route close to the position indicated by the position information on the user device 300A. The user can view the display, select a facility the user wants to visit, and send to the server device 200 the information about a request to ride on the autonomous driving vehicle 100 that travels to the facility.

In addition, when the application 3061 is executed, the input field is displayed on the screen of the display unit 308 of the user device 300A. This field allows the user to enter the information on a booking instruction or a switching instruction in response to a promotion provided on the autonomous driving vehicle 100 that transports the user to a facility.

In FIGS. 2, 3, and 4, the autonomous driving vehicle 100, server device 200, and user device 300 are connected by the same network N. Note that this connection may be established by a plurality of networks. For example, a network that connects the autonomous driving vehicle 100 and the server device 200, a network that connects the server device 200 and the user device 300, and a network that connects the autonomous driving vehicle 100 and the user device 300 may be different.

The processing in the system S having the configuration described above will be described below. First, the situation shown in FIG. 1 will be described. In FIG. 1, two facilities, a comic facility F1 and a bar facility F2, are shown as an example of the facility F. Each of the comic facility F1 and the bar facility F2 has a plurality of docking parts DP. Although FIG. 1 shows only two docking parts DP in each of the comic facility F1 and the bar facility F2, the number of docking parts DP used in a facility is not limited. Only the riding unit 111 of the autonomous driving vehicle 100 can be docked, that is, connected to each docking part DP. When the riding unit 111 is detachably docked to the driving unit 110, the driving unit 110 of the autonomous driving vehicle 100 supplies power to the riding unit 111. On the other hand, when the riding unit 111 is docked to the docking part DP but is not connected to the driving unit 110, the riding unit 111 receives power from the docking part DP.

In the comic facility F1 shown in FIG. 1, two docking parts DP are shown and the riding unit 111 is docked to one of the two docking parts. This configuration allows one or more users on the riding unit 111 to receive the provision of a desired comic commercial product or a desired comic service in the comic facility F1. The same applies to the bar facility F2. When booking a facility, the user should book the provision of a service or a commercial product that the user wants to receive at the facility F. This makes it possible to increase the expectation of the user when the vehicle arrives at the facility.

In FIG. 1, each of the autonomous driving vehicles 100A and 100B is equipped with the riding unit 111 on which users can ride. On the other hand, the autonomous driving vehicle 100C has the riding unit 111 disconnected and has no riding unit 111, meaning that the autonomous driving vehicle 100C can be connected to the riding unit 111 at any one of the facilities F.

In addition, in FIG. 1, the user device 300A of the user U is shown as a user device. An example of processing among the user device 300A, the autonomous driving vehicle 100A, and the server device 200 will be described below with reference to FIGS. 5 and 6. First, the processing among them will be described based on the time chart in FIG. 5. In the time chart in FIG. 5, time elapses from top to bottom in the figure.

Figure 5:
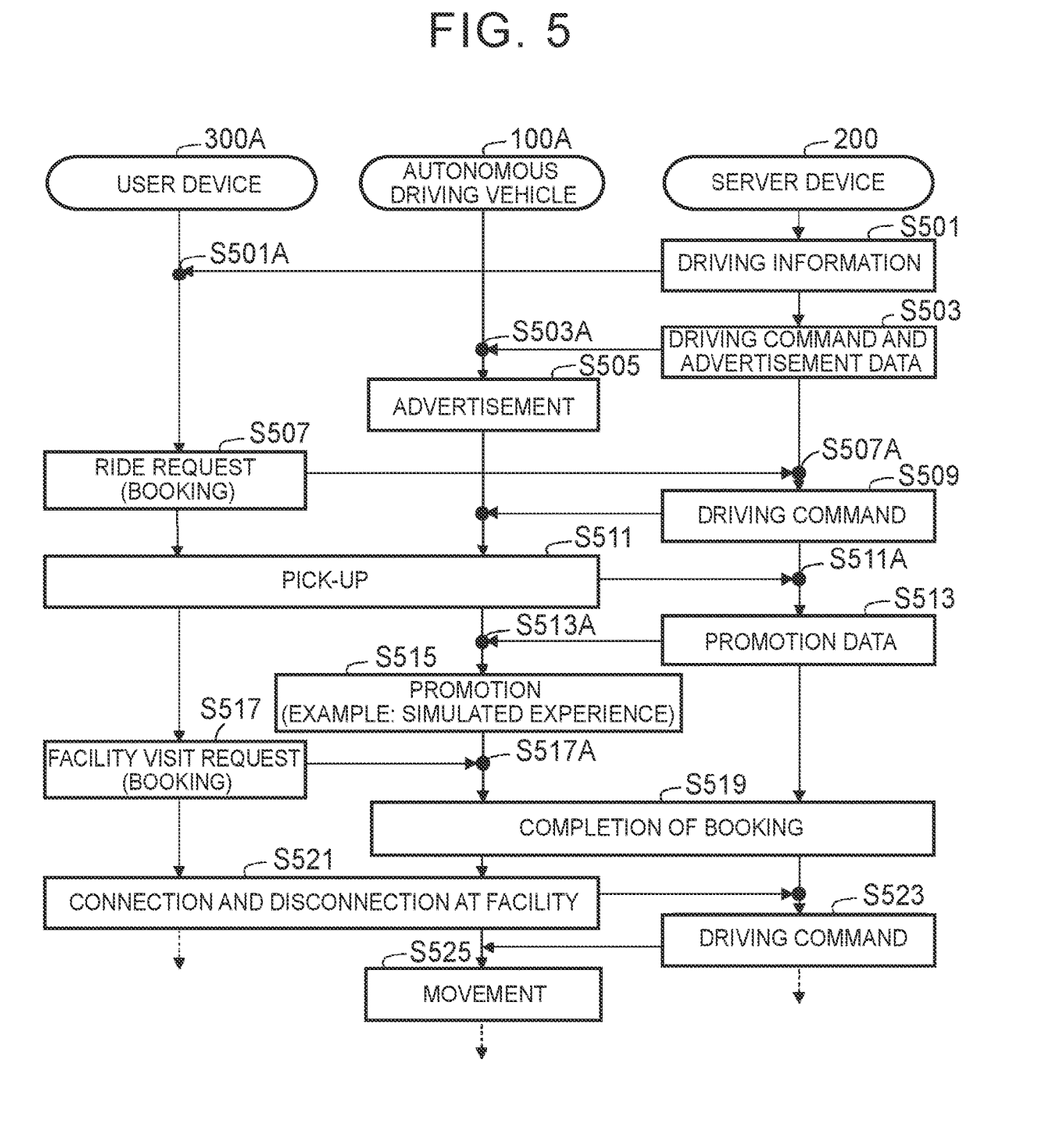
FIG. 5 is a time chart showing an example of processing flow in the system shown in FIG. 1.

When a predetermined condition is satisfied (for example, a predetermined time has arrived), the server device 200 delivers the driving information, which indicates that the service of transportation to the comic facility F1 is in operation, to the user devices 300 in a predetermined area (step S501 in FIG. 5). When the driving information is delivered in this way, the user device 300 (300A, . . . ) acquires the driving information (step S501A in FIG. 5) and displays the acquired information for browsing by the user.

On the other hand, the server device 200 sends a driving command, which causes the autonomous driving vehicle 100A to transport users to the comic facility F1, to the autonomous driving vehicle 100A; at the same time, the server device 200 sends the advertisement data D1 regarding the services or commercial products, provided at the comic facility F1, to the autonomous driving vehicle 100A (step S503 in FIG. 5). The driving command and the advertisement data D1 are acquired by the information acquisition unit 1041 of the autonomous driving vehicle 100A (step S503A in FIG. 5). The plan generation unit 1042 of the autonomous driving vehicle 100A, which has acquired the driving command and the advertisement data D1, generates a driving plan, so that the autonomous driving vehicle 100A travels to the comic facility F1. At the same time, the advertisement providing unit 1045 of the autonomous driving vehicle 100A displays the advertisement "MANGA" on the advertisement display unit 109A, based on the advertisement data provided by and acquired from the server device 200 (step S505 in FIG. 5). FIG. 1 shows the autonomous driving vehicle 100A that displays the advertisement "MANGA" on the advertisement display unit 109A.

When the user U views the driving information on the user device 300A and wants to go to the comic facility F1, the user U presses the ride-request (that is, ride booking) input button on the user device 300A (step S507) to request a ride on the autonomous driving vehicle 100A that transports users to the comic facility F1. When this input button is pressed, the transportation management unit 2044 of the server device 200 acquires the information on the ride request (step S507A in FIG. 5) and sends to the autonomous driving vehicle 100A a driving command to pick up the user U at the predetermined position at the predetermined time (step S509 in FIG. 5). When this driving command is received. the autonomous vehicle 100A can pick up the user U at the predetermined time and the predetermined position (step S511 in FIG. 5). At the time when the user U rides on the vehicle, the information processing device 102 of the autonomous driving vehicle 100A communicates with the user device 300A of the user U to confirm the user and sends the riding information on the user U to the server device 200. The server device 200 receives the riding information (step S511A in FIG. 5).

When it is confirmed that the user U has ridden on the autonomous driving vehicle 100A, the transportation management unit 2044 of the server device 200 searches the user information database 2063 based on the user information on the user U. Then, the transportation management unit 2044 searches the facility information database 2062 for the promotion data D2 regarding the comic facility F1 in accordance with the characteristics (e.g., age) of the user and extracts the promotion data D2 that has been searched for. The transportation management unit 2044 sends the extracted promotion data D2 to the autonomous driving vehicle 100A via the information providing unit 2045 (step S513 in FIG. 5). The autonomous driving vehicle 100A acquires the promotion data D2 (step S513A in FIG. 5) and sends it to the promotion providing unit 1046. The promotion providing unit 1046 displays the promotion image, which is based on the acquired promotion data D2, on the promotion display unit 109B in such a way that the promotion is provided based on the acquired promotion data D2 (step S515 in FIG. 5). The processing in S515 is thought of as an example of providing a promotion based on data. The processing in S515 is thought of as an example of providing a first promotion based on data.

In this example, the services or commercial products provided by the comic facility F1 are related to comics. At the comic facility F1, the user can freely select favorite books from many comic books and read the selected books. Considering the characteristics of the comic facility F1 described above, the image of a specific comic (a part of rare comic books in this example) is provided as a promotion for the comic facility F1 in this example in accordance with the characteristics of the user U. Therefore, the user U can have a simulated experience of reading a comic book available at the comic facility F1 in the autonomous driving vehicle 100A. To provide this simulated experience in a more suitable manner, the user information database 2063 is referred to when the promotion data is extracted. The user information database 2063 may have a record of at least one of the age, sex, occupation, and past usage history of comic books at the comic facility F1 of the user U.

When the provided promotion of the comic facility F1 does not suit the preference, the user U can press the promotion switching button on the user device 300A to request the autonomous driving vehicle 100A to switch the promotion to another promotion. When the promotion switching button is pressed, the promotion providing unit 1046 of the autonomous driving vehicle 100A can communicate with the server device 200 to acquire another piece of promotion data on the comic facility F1. As a result, the user U is provided with another promotion image.

For example, when the user U likes the provided promotion, the user U can press the facility-booking input button on the user device 300A (step S517 in FIG. 5). This causes the autonomous driving vehicle 100A to acquire the facility booking information (step S517A in FIG. 5). This facility booking information is sent to the booking unit 1047 of the autonomous driving vehicle 100A. The booking unit 1047 can communicate with the server device 200 to book the comic facility F1 for the user U (step S519). At the time of this booking, the server device 200 can further communicate with the information processing device of the comic facility F1 to take into consideration the congestion status of the comic facility F1. At this time, the booking unit 1047 should book the facility in consideration of the estimated arrival time of the autonomous driving vehicle 100A at the comic facility F1.

After that, the autonomous driving vehicle 100A travels to the comic facility F1 as originally planned and is connected to a vacant docking part DP at the comic facility F1. When the autonomous driving vehicle 100A is connected to a vacant docking part DP, the riding unit 111 of the autonomous driving vehicle 100A is connected to the docking part DP and the riding unit 111 receives power from the docking part DP. After the riding unit 111 is connected to the docking part DP, the autonomous driving vehicle 100A disconnects the riding unit 111 (step S521 in FIG. 5). At this time, the information indicating the current status of the autonomous driving vehicle 100A is sent to the server device 200.

In the server device 200, the transportation management unit 2044 can acquire, via the information acquisition unit 2041, the information about a movement request from the riding unit 111 docked at various facilities or from the user devices 300 associated with the riding unit 111. When the information about a movement request is acquired, the transportation management unit 2044 sends the driving command information to the autonomous driving vehicle 100A so that the autonomous driving vehicle 100A will move to the riding unit 111 (step S523 in FIG. 5). This information is sent to the plan generation unit 1042 of the autonomous driving vehicle 100A to generate a driving plan. According to this driving plan, the autonomous driving vehicle 100A moves to the riding unit 111.

Next, the processing that is performed when the comic facility F1 cannot be booked will be described with reference to FIG. 6. In the following description, steps S601 to S617 and steps S627 to S633 of the time chart in FIG. 6 correspond to steps S501 to S517 and steps S519 to S525 of the time chart in FIG. 5, respectively. Therefore, the description of these steps is omitted.

Figure 6:
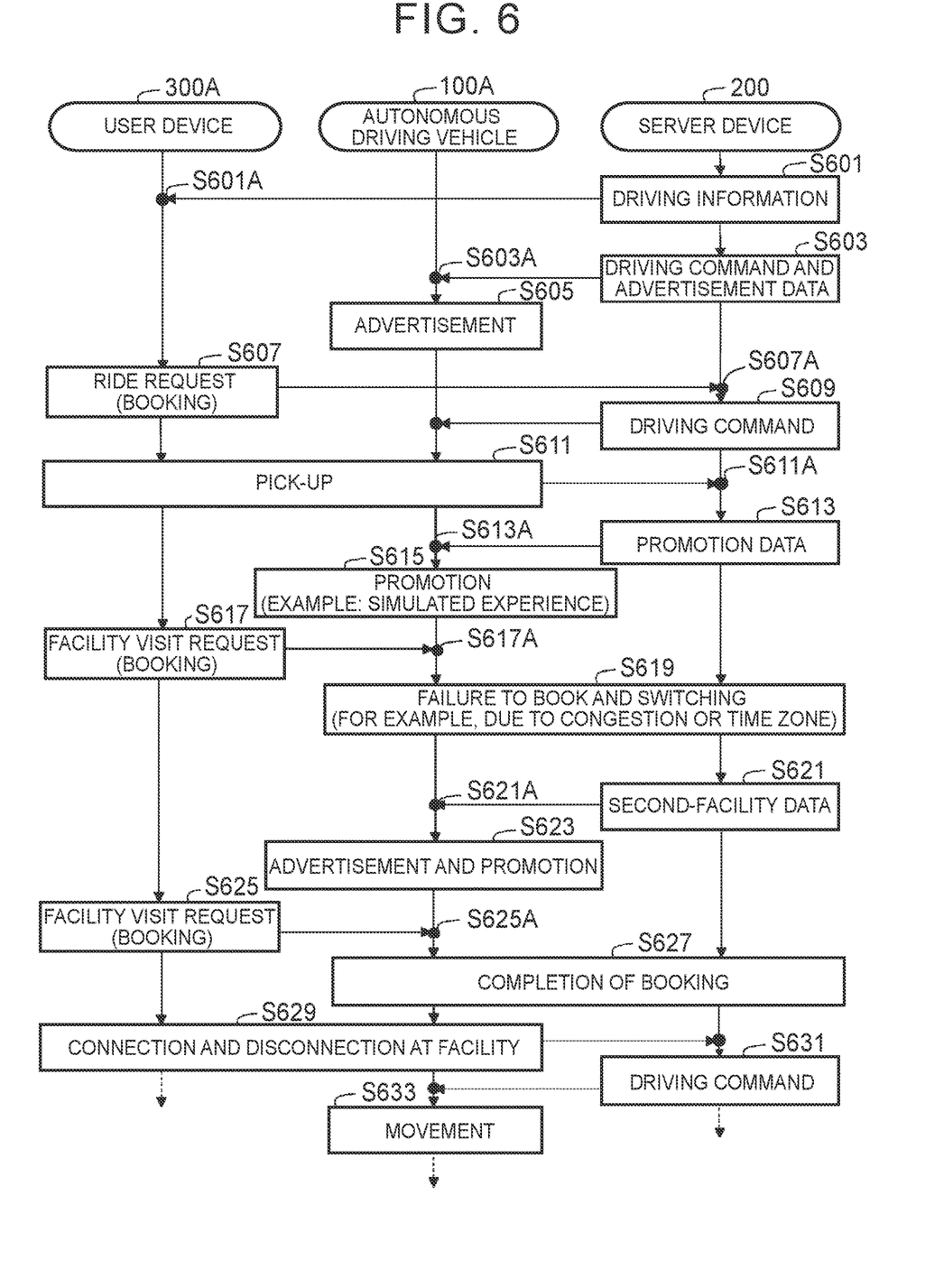
FIG. 6 is a time chart showing an example of another processing flow in the system shown in FIG. 1.

When the user U likes the provided promotion and presses the facility-booking input button on the user device 300A in step S617 in FIG. 6, the autonomous driving vehicle 100A acquires the facility booking information (step S617A in FIG. 6). This facility booking information is sent to the booking unit 1047 of the autonomous driving vehicle 100A. The booking unit 1047 can communicate with the server device 200 to book the comic facility F1 for the user U. However, when there is no vacant docking part DP in the comic facility F1 at the estimated arrival time of the autonomous driving vehicle 100A, the comic facility F1 cannot be booked (failure to book in step S619 in FIG. 6). For example, when the remaining vacant docking part DP is already booked by the autonomous driving vehicle 100B that also performs the service of transportation to the comic facility F1, the comic facility F1 cannot booked. At this time, the booking unit 1047 of the control unit 104 of the autonomous driving vehicle 100A activates the switching unit. 1048.

When the comic facility F1 is initially a first facility, the switching unit 1048 switches the facility, corresponding to a promotion provided by the promotion providing unit 1046, to another facility, that is, to a second facility. When the switching instruction is received from the booking unit 1047, the switching unit 1048 selects a new facility to which to switch based on the information such as the user information and the time of day. To help this selection, a database including a list of candidate facilities and the services or commercial products provided in each of the facilities is provided from the facility information database 2062 stored in the storage unit 206 of the server device 200. In this example, the switching unit. 1048, which receives the switching instruction, selects the second facility based on the age of the user and the time of day. Since the user is an adult and it is a nighttime, the switching unit. 1048 refers to the database and selects the bar facility F2 as the second facility. At this time, the switching unit. 1048 communicates with the server device 200 to confirm that the bar facility F2, which is the second facility, has a vacant seat. In this way, the predetermined switching condition for switching the facility F at the transportation destination includes (1) the first facility cannot be booked due to congestion at the first facility and (2) the second facility has a vacant seat at the time of day. However, the predetermined switching condition may be freely determined in association with the congestion at the first facility or the time of day.

When the bar facility F2 is set as the second facility, the switching unit. 1048 requests the server device 200 to send the advertisement data D1 and promotion data D2 for the bar facility F2. In response to this request, the transportation management unit 2044 of the server device 200 provides the advertisement data D1 and promotion data D2 on the bar facility F2 to the autonomous driving vehicle 100A (step S621 in FIG. 6). The autonomous driving vehicle 100A acquires the advertisement data D1 and promotion data D2 (step S621A in FIG. 6). Using the advertisement data acquired in this way, the advertisement providing unit 1045 of the control unit 104 of the autonomous driving vehicle 100A displays the advertisement on the advertisement display unit 109A based on the advertisement data D1. Furthermore, the promotion providing unit 1046 of the autonomous driving vehicle 100A displays the promotion on the promotion display unit 109B based on the promotion data D2 (step S623 in FIG. 6). The processing in S623 is thought of as the processing for providing the second promotion based on the second data.

As a result, when the user U likes the provided promotion, the user U can book the bar facility F2 via the user device 300A (step S625 in FIG. 6). The following processing is the same as the processing after step S517 in FIG. 5.

As described above, the processing of the control unit 104 of the information processing device 102 of the autonomous driving vehicle 100A in the system S provides the user U with a promotion related to the services or commercial products of the comic facility F1 or the bar facility F2. In the system S described above, the user U receives the provision of a promotion while being transported to the comic facility F1 or the bar facility F2. Therefore, in providing services or commercial products at the facility F, this system further enhances the convenience of the user who receives the provision of services and commercial products.

Although the user is a user of the user device 300 in the above embodiment, any other person may become a user. For example, when a user waves his or her hand to the autonomous driving vehicle while the transportation service is in operation, the information processing device 102 of the autonomous driving vehicle 100 may determine a person waving his or her hand as a user and allows him or her to ride on an autonomous vehicle. This can be done by analyzing the images captured by the camera installed in the autonomous driving vehicle 100.

The above embodiment is merely an example, and the present disclosure may be modified as necessary and implemented without departing from the spirit thereof. The processing and units described in the present disclosure can be freely combined and implemented as long as there is no technical contradiction.

In addition, the processing described as being performed by one device may be shared and executed by a plurality of devices. For example, the server device 200 or the information processing device 102 of the autonomous driving vehicle 100, each of which is an information processing device, need not be one computer and may be configured as a system including a plurality of computers. The processing described as being performed by different devices may be performed by one device. In the computer system, it is possible to flexibly change the hardware configuration to implement each function.

The present disclosure can also be implemented by supplying a computer program, which implements the functions described in the above embodiment, to a computer so that one or more processors of the computer can read and execute the program. Such a computer program may be provided to the computer by a non-transitory computer-readable storage medium that can be connected to the system bus of the computer or may be provided to the computer via a network. The non-transitory computer-readable storage medium includes any other type of disk such as a magnetic disk (floppy (registered trademark) disk, hard disk drive (HDD), etc.) and an optical disc (CD-ROM, DVD disc, Blu-ray disc, etc.). The non-transitory computer readable storage medium also includes a read only memory (ROM), a random access memory (RAM), an EPROM, an EEPROM, a magnetic card, a flash memory, an optical card, and any other type of media suitable for storing electronic instructions.

What is claimed is:

1. An autonomous vehicle configured to transport a user to a first facility that provides services or commercial products and, at the same time, configured to perform an advertising activity for the services or the commercial products of the first facility, the autonomous vehicle comprising:
    a riding compartment, the riding compartment being configured to be docked detachably to another portion of the autonomous vehicle, and the riding compartment including a display mounted therein; and
    a processor programmed to:
        acquire data for providing a promotion in the riding compartment, the promotion being related to the services and the commercial products at the first facility, and
        display the promotion on the display in the riding compartment of autonomous vehicle, based on the acquired data,
        control the autonomous vehicle to travel to the first facility, in response to a user request,
        acquire second data for providing a second promotion on the display when a predetermined switching condition is satisfied while the promotion is being provided, the second promotion being related to services or commercial products at a second facility, the second facility being different from the first facility, and
        display the second promotion on the display, based on the acquired second data, and
        control the autonomous vehicle to travel to the second facility, in response to a user request, and after the predetermined switching condition is satisfied,
    wherein the autonomous vehicle is configured to disconnect from the riding compartment and the display at the first facility or the second facility.

2. The autonomous vehicle according to claim 1, wherein the processor is further configured to book the first facility or the second facility when booking information is acquired from the user in the riding compartment, the user in the riding compartment being provided with the promotion or the second promotion.

3. The autonomous vehicle according to claim 1, wherein the predetermined switching condition is determined in association with congestion at the first facility or a time of day.

4. The autonomous vehicle according to claim 1, wherein the processor is further programmed to switch the advertising activity from the services or the commercial products at the first facility to the services or the commercial products at the second facility when the predetermined switching condition is satisfied.

5. The autonomous vehicle according to claim 1, wherein providing the promotion includes providing a simulated experience related to the services or the commercial products at the first facility.

* * * * *